(12) United States Patent
Johansson et al.

(10) Patent No.: US 11,976,763 B2
(45) Date of Patent: May 7, 2024

(54) FIBRE REINFORCED POLYMER TUBE

(71) Applicant: HITACHI ENERGY SWITZERLAND AG, Baden (CH)

(72) Inventors: Anders C Johansson, Jackson, TN (US); Magnus U. Henriksson, Luleå (SE); Anders Holmberg, Öjebyn (SE)

(73) Assignee: HITACHI ENERGY LTD, Zürich (CH)

( * ) Notice: Subject to any disclaimer, the term of this patent is extended or adjusted under 35 U.S.C. 154(b) by 759 days.

(21) Appl. No.: 17/055,259

(22) PCT Filed: Jul. 3, 2019

(86) PCT No.: PCT/EP2019/067861
§ 371 (c)(1),
(2) Date: Nov. 13, 2020

(87) PCT Pub. No.: WO2020/007919
PCT Pub. Date: Jan. 9, 2020

(65) Prior Publication Data
US 2021/0199224 A1 Jul. 1, 2021

(30) Foreign Application Priority Data
Jul. 4, 2018 (EP) ..................................... 18181594

(51) Int. Cl.
*F16L 47/16* (2006.01)
*B29C 70/30* (2006.01)
(Continued)

(52) U.S. Cl.
CPC .............. *F16L 47/16* (2013.01); *B29C 53/56* (2013.01); *B29C 70/30* (2013.01); *B29C 70/545* (2013.01);
(Continued)

(58) Field of Classification Search
CPC ....... F16L 47/16; F16L 19/121; F16L 19/123; B29C 53/56; B29C 70/30; B29C 70/545; B29L 2023/22
(Continued)

(56) References Cited

U.S. PATENT DOCUMENTS 4,906,506 A 3/1990 Nishimura et al.
8,869,840 B2 * 10/2014 Lund ..................... E21B 17/017
138/120

(Continued)

FOREIGN PATENT DOCUMENTS

EP    1170117 A1    1/2002
EP    1559939 A1    8/2005
(Continued)

OTHER PUBLICATIONS

Extended European Search Report dated Jan. 7, 2019 for European Patent Application No. 18181594.5, 3 pages.
(Continued)

*Primary Examiner* — David R Deal
(74) *Attorney, Agent, or Firm* — Sage Patent Group

(57) ABSTRACT

The present disclosure relates to a fibre reinforced polymer (FRP) tube, the tube comprising a plurality of concentric layers of an FRP material forming a shell of the tube. At least one blind threaded longitudinal bolt hole is provided from a transverse end surface of the shell. The bolt hole extends in at least three of the plurality of layers, a middle layer encompassing a plane passing through a center of the bolt hole, an inner layer encompassing a plane of an innermost extent of the bolt hole, and an outer layer encompassing a plane of an outermost extent of the bolt hole. The fibre filament of each of the inner and outer layers has been wound at a first angle to the longitudinal axis and the fibre filament of the middle layer has been wound at a second angle to the longitudinal axis.

20 Claims, 3 Drawing Sheets

(51) Int. Cl.
*F16L 9/12* (2006.01)
*B29L 23/00* (2006.01)
*B29C 53/56* (2006.01)
*B29C 70/54* (2006.01)

(52) U.S. Cl.
CPC .............. *F16L 9/121* (2013.01); *F16L 9/123* (2013.01); *B29L 2023/22* (2013.01)

(58) Field of Classification Search
USPC ........................................................ 138/110
See application file for complete search history.

(56) References Cited

U.S. PATENT DOCUMENTS

| | | | |
|---|---|---|---|
| 9,551,324 B2 | 1/2017 | Minadeo | |
| 2004/0025952 A1* | 2/2004 | Cunningham | F16L 3/1033 138/110 |
| 2008/0142106 A1* | 6/2008 | Berland | H01R 13/562 138/119 |

FOREIGN PATENT DOCUMENTS

| | | |
|---|---|---|
| EP | 2532881 A2 | 12/2012 |
| EP | 3225900 A1 | 10/2017 |
| WO | 2009/089833 A2 | 7/2009 |
| WO | 2017091904 A1 | 6/2017 |

OTHER PUBLICATIONS

International Preliminary Report on Patentability dated Jan. 14, 2021 for International Application No. PCT/EP2019/067861, 7 pages.
International Search Report and Written Opinion dated Aug. 1, 2019 for International Patent Application No. PCT/EP2019/067861, 8 pages.
Indian Examination Report dated May 31, 2021 for Indian Patent Application No. 202047057412, 6 pages.

* cited by examiner

FIBRE REINFORCED POLYMER TUBE

CROSS-REFERENCE TO RELATED APPLICATIONS

This application is a 35 U.S.C. § 371 national stage application of PCT International Application No. PCT/EP2019/067861 filed on Jul. 3, 2019, which itself claims priority to European Patent Application No. 18181594.5 filed Jul. 4, 2018, the disclosures and contents of which are incorporated by reference herein in their entireties.

TECHNICAL FIELD

The present disclosure relates to a fibre reinforced polymer (FRP) tube, the tube comprising a plurality of concentric layers of an FRP material forming a shell of the tube.

BACKGROUND

A common design challenge for FRP tube applications is to facilitate efficient, robust and durable axial load transfer between connected tube segments or between a tube and connecting parts such as flanges or lids. Traditionally, this is accomplished by adhesive joints, through thickness bolted joints relying on bearing strength, and in some cases connections with internal surface or external surface threads on the tube. There are also examples where threaded bolts are axially screwed into the FRP tube wall. However, bolt holes and threads cut the fibres, weakening the FRP material at the bolt hole threads and reducing axial strength of the joint.

U.S. Pat. No. 4,906,506 discloses an FRP tube comprising several layers of woven fibre material where the layers are positioned such that the warps and wefts are in different directions in the different layers.

EP 3 225 900 discloses an FRP tube comprising two outer fibre layers, a hoop wrapping layer formed by wrapping fibre bundles with a fibre angle between 80 and 100 degrees, and a braided layer formed by braiding fibre bundles with a fibre angle below 75 degrees.

WO2009/089833 discloses a wind turbine blade with at least two connection members such as bushings and/or threaded bars in the root of said blade for attaching said blade to a hub.

SUMMARY

It is an objective of the present invention to provide an FRP tube with threaded longitudinal (i.e. axial) boll hole(s) for tube to end fitting joints having increased axial strength. End fittings as herein discussed may be any parts connected to an end of an FRP tube, e.g. a flange or lid.

The invention relates to FRP tubes which are made from a plurality of layers (multi-ply) wound around the longitudinal axis of the tube to form a shell thickness of the tube. In said shell, at the ends of the tube, one or several threaded boll holes are provided. In accordance with the invention, the fibre orientations in the different layers differ in order to better follow the pitch (or lead) of the thread in the hole at respective layer, thus reducing the number of cut fibres and reinforcing the holes to increase the pull-out force of the bolls in the axial direction.

According to an aspect of the present invention, there is provided a fibre reinforced polymer (FRP) tube having a longitudinal axis and a circular cross section. The tube comprises a plurality of concentric layers of an FRP material forming a shell of the tube. At least one blind threaded longitudinal boll hole is provided from a transverse end surface of the shell. The boll hole extends in at least three of the plurality of layers, a middle layer encompassing a plane passing through a centre of the bolt hole, an inner layer encompassing a plane of an innermost extent of the bolt hole, and an outer layer encompassing a plane of an outermost extent of the boll hole. The FRP material for each of the plurality of layers is formed from at least one wound continuous fibre filament in a solid polymer resin. The filament of each of the inner and outer layers has been wound at a first angle to the longitudinal axis corresponding to 90° minus a lead angle of the threading of the boll hole ±5° or ±2°. The filament of the middle layer has been wound at a second angle to the longitudinal axis corresponding to 90° minus half of a thread angle of the threading of the boll hole ±5° or ±2°.

According to another aspect of the present invention, there is provided an FRP tube assembly comprising an embodiment of an FRP tube in accordance with the present disclosure, a connecting part such as an end fitting or another FRP tube in accordance with the present disclosure, and a joint joining the transverse end surface of the FRP tube to the connecting part by means of threaded bolts screwed into the respective at least one blind threaded longitudinal boll hole of the FRP tube and the connecting part, whereby the first FRP tube and the connecting part are fastened to each other and longitudinally arranged next to each other.

According to another aspect of the present invention, there is provided a method of forming a shell comprising a plurality of concentric layers of an FRP material. The shell being for/of an FRP tube having a longitudinal axis and a circular cross section. At least one blind threaded longitudinal boll hole is provided from a transverse end surface of the shell. The method comprises forming each of the plurality of layers of the shell by, around a support tube, applying a polymer resin and winding at least one continuous fibre filament at an angle to the longitudinal axis, followed by curing of the polymer resin to form the layer having the wound filament in a solid resin matrix. The filament of an inner layer of the plurality of layers is wound at a first angle to the longitudinal axis corresponding to 90° minus a lead angle of the threading of the boll hole ±5° or ±2°. The filament of a middle layer, concentrically outside of the inner layer, is wound at a second angle to the longitudinal axis corresponding to 90° minus half of a thread angle of the threading of the boll hole ±5° or ±2°. The filament of an outer layer, concentrically outside of the middle layer, is wound at the first angle to the longitudinal axis. The method also comprises drilling the at least one boll hole from a transverse end surface of the shell of the formed plurality of layers. The method also comprises threading the at least one drilled bolt hole with said threading.

By means of the different first and second angles of the filaments in the different layers, the fibres will to a larger degree extend into the ridge of the thread in the bolt hole, thus improving the axial strength of thereof (i.e. the force needed to pull out the boll from the boll hole in the axial direction). The different angles of the filaments in the different layers are adapted to the intended lead and thread angles of the thread in the boll hole(s). Thus, the respective filaments of the inner and outer layers may extend into the thread ridge without being cut, or only being cut to a lesser degree, by the threaded boll hole, and the filament in the middle layer may be cut by the threaded boll hole such that the filament ends thus formed extend into the thread ridge to a greater degree than if other angles are chosen.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

When axially joining an FRP tube to an end fitting, or possibly to another FRP tube, to form an assembly, individual tubes which each has at least one (preferably several, such as two or four, blind threaded longitudinal boll hole in either end, in/from a transverse end surface of the tube shell, are axially joined together by correspondingly threaded bolts screwed into the respective bolt holes such that the respective end surfaces of the tubes and end fittings are fastened to each other, preferably in direct contact with each other. It is desirable that the threaded bolt holes are able to securely hold the bolts fastening the tubes to each other, especially in respect of axial stress, why the threaded bolt holes should be able to withstand as high pull-out force on the bolls as possible with as little creep or stress relaxation as possible. Thus, by means of embodiments of the present invention, the FRP material which is present in the ridges of the threads in the boll holes, i.e. between the major and minor diameters of each boll hole, should contain as much, and as long, fibre filament reinforcement as suitable, and not only resin with short fibre fragments, in order for the ridge of the thread to hold the boll in place against (especially) longitudinal stress (pull-out force) on the boll. It is also preferable that the fibres to as high extent as possible are oriented such that the fibres in the thread are stressed in the fibre direction when the boll is subject to longitudinal stress.

Figure 1:
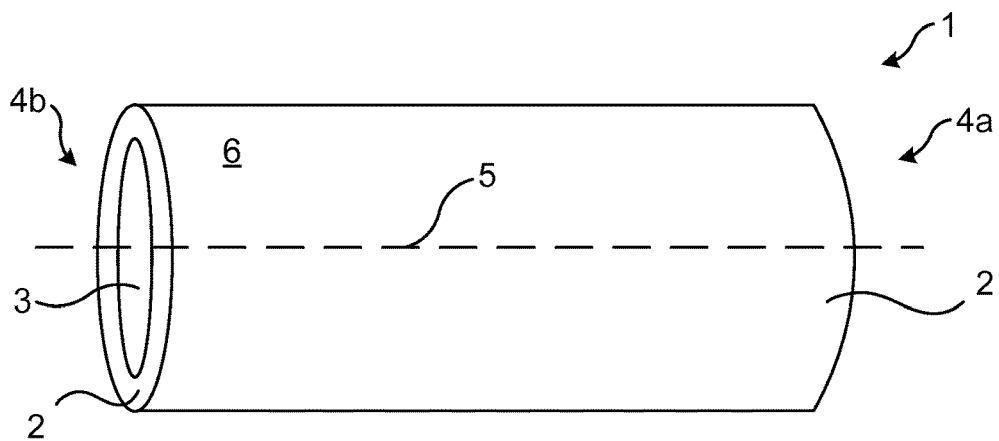
FIG. 1 is a schematic longitudinal side view of an embodiment of an FRP tube in accordance with the present invention.

FIG. 1 illustrates a tube 1 with a shell 2 of an FRP material 6, the tube having a longitudinal axis 5 and two ends 4, a first end 4a and a second end 4b, each represented by a transverse end surface 4 of the shell 2. The shell is hollow circular, forming an inner cylindrical space 3 within the shell, whereby the tube is tubular.

Figures 2A, 2B:
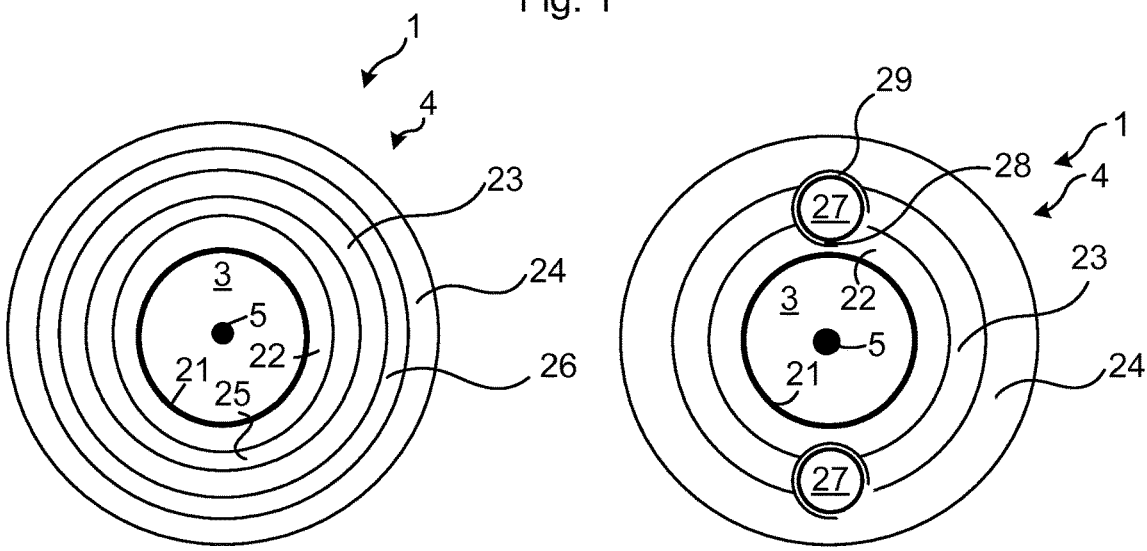
FIG. 2a is a transverse side view of an end of an embodiment of an FRP tube, before a longitudinal bolt hole is drilled therein, in accordance with the present invention.
FIG. 2b is a transverse side view of an end of an embodiment of an FRP tube with longitudinal boll holes, in accordance with the present invention.

FIG. 2a illustrates a tube shell 2 comprising a plurality of concentric layers of the FRP material 6, as seen from one of the end surfaces 4 of the shell.

The shell 2 may comprise any number of concentric layers, each laminated on top of each other. The layers may have the same or different thickness. Each of the layers comprises a solid resin matrix reinforced by at least one wound continuous fibre filament.

FIG. 2a shows the end surface 4 before any boll hole(s) have been drilled into it. In the embodiment of FIG. 2a, the shell 2 comprises five concentric layers around a support tube 21, an inner layer 22, a middle layer 23 and an outer layer 24, as well as two intermediate layers 25 and 26 of which one is positioned between the inner layer and the middle layer and one is positioned between the middle layer and the outer layer.

FIG. 2b illustrates an end surface 4 of a shell having only three layers, an inner layer 22, a middle layer 23 and an outer layer 24, and two boll holes 27 have been drilled longitudinally into the shell 2 from the end surface 4. Each of the boll holes 27 is positioned in relation to the layers such that the boll hole extends in the three layers wherein the middle layer 23 encompasses a plane passing through a centre of the bolt hole 27, the inner layer 22 encompasses a plane of an innermost extent (28) of the boll hole, and the outer layer 24 encompasses a plane of an outermost extent (29) of the boll hole. The (imaginary) planes may preferably be curved in conformity with the respective layers they are encompassed in. Thus, the bolt hole cuts through the whole thickness of the middle layer 23, but only though a part of the thickness of the inner and outer layers 22 and 24, respectively.

Each of the boll holes 27 is longitudinal in that it is substantially parallel to the longitudinal axis 5 of the tube 1. Each of the boll holes is a blind hole, only having one opening which is through the end surface 4 from which it is drilled. Each of the boll holes is threaded to exhibit a thread corresponding to a threading of a bolt intended to be screwed into the bolt hole for axially joining the tube 1 with an end fitting or another similar tube 1.

Figure 3:
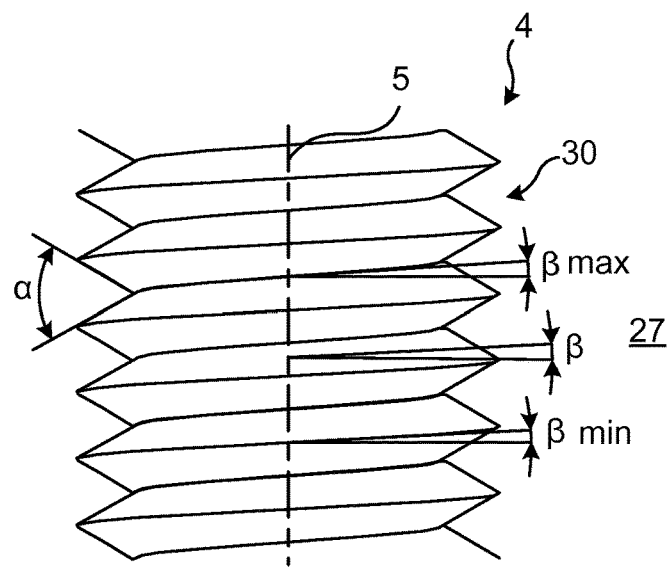
FIG. 3 is a schematic view in longitudinal section of a detail of a threaded bolt hole, in accordance with the present invention.

FIG. 3 illustrates a part of a thread 30 in a boll hole 27 in longitudinal section, e.g. as discussed with reference to FIG. 2b. The thread 30 has a thread angle α formed between the two flanks of the groove extending to the crest of the thread. Typically, the thread angle α is the same as the angle between the two flanks of the groove extending to the root of the thread (as in the figure). Further, the thread 30 has a lead angle β, between a transverse plane and the crest (β min) or root (β max) of the thread, depending on the lead or pitch of the thread.

Figure 4:
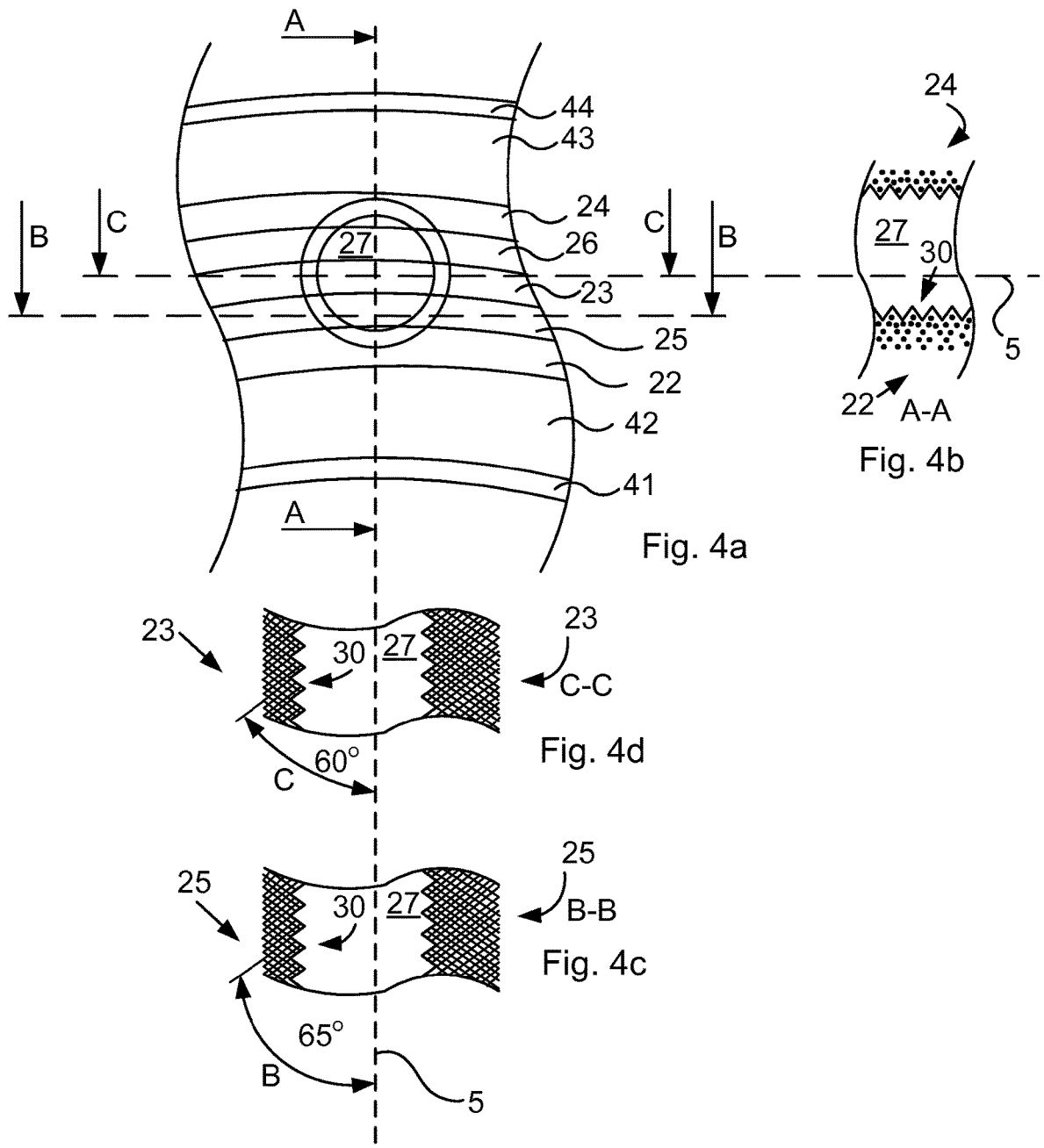
FIG. 4a is a schematic transverse side view of a detail of an end of an embodiment of an FRP tube with a longitudinal boll hole, in accordance with the present invention.
FIG. 4b is a schematic view in longitudinal section along line A-A of FIG. 4a of a detail of a threaded boll hole, in accordance with the present invention.
FIG. 4c is a schematic view in longitudinal section along line B-B of FIG. 4a of a detail of a threaded boll hole, in accordance with the present invention.
FIG. 4d is a schematic view in longitudinal section along line C-C of FIG. 4a of a detail of a threaded boll hole, in accordance with the present invention.

FIG. 4a illustrates a part of a wall of the shell 2, in which a longitudinal boll hole 27 is drilled from the end surface 4. The boll hole is illustrated with two circles, corresponding to the major and minor diameters of the threading 30 of the boll hole. In addition to the inner 22, middle 23 and outer 24 layers, and two intermediate layers 25 and 26, additional layers within which the boll hole does not extend are included in the plurality of concentric layers of this embodiment of the shell, i.e. outermost layers 43 and 44 and innermost layers 41 and 42. FIG. 4a also shows section lines A-A, B-B and C-C through the bolt hole, for FIGS. 4b, 4c and 4d.

FIG. 4b illustrates a longitudinal section of bolt hole 27 along section line A-A in FIG. 4a, through the centre of the boll hole in a radial direction of the tube 1. The thread 30, i.e. located between the major and minor diameters of the thread, is here extending into the inner layer 22 and the outer layer 24, and the respective fibre filament(s) of those layers are wound at such an angle that they follow the lead of the thread. This is in FIG. 4b illustrated by the fibre filament(s) being represented by dots, indicating that they extend in a direction substantially perpendicular to the plane of the figure. The (first) angle of the wound filament(s) to the longitudinal axis 5 may e.g. be 90°−β or close thereto, e.g. 87° corresponding to a lead angle β of 3°.

FIG. 4c illustrates a longitudinal section of bolt hole 27 along section line B-B in FIG. 4a. The thread 30, i.e. located between the major and minor diameters of the thread, is here extending through intermediate layer 25, and fibre filament(s) of that layer is wound at an angle to the longitudinal axis 5 such that the cut ends of the filament(s) extend into the ridge of the threading, preferably all the way to its crest. In the example of FIG. 4c the (third) angle B of the wound filament(s) to the longitudinal axis is 65°. The similar would be true for a section line passing through intermediate layer 26.

FIG. 4d illustrates a longitudinal section of bolt hole 27 along section line C-C in FIG. 4a, through the centre of the boll hole. The thread 30, i.e. located between the major and minor diameters of the thread, is here extending through the middle layer 23, and fibre filament(s) of that layer is wound at an angle to the longitudinal axis 5 such that the cut ends of the filament(s) extend into the ridge of the threading, preferably all the way to its crest. The (second) angle C of the wound filament(s) to the longitudinal axis 5 may e.g. be 90°−α/2 or close thereto. In the example of FIG. 4c the (third) angle of the wound filament(s) to the longitudinal axis is 60°, corresponding to a thread angle α of 60°.

Figure 5:
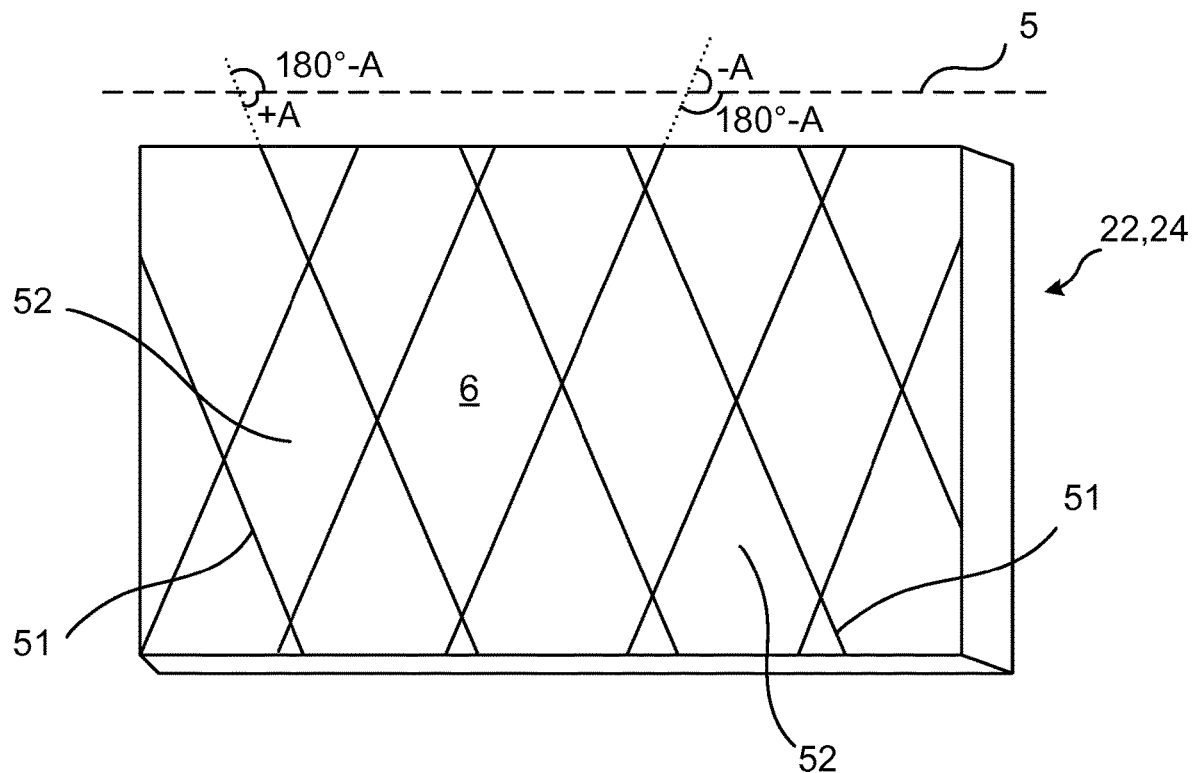
FIG. 5 is a schematic top view of an embodiment of a layer, laid out, of an FRP material, in accordance with the present invention.

FIG. 5 illustrates one of the plurality of layers, laid out flat to show how a fibre filament 51 is reinforcing a resin 52 to form the FRP material 6. How densely the filament is wound, and in how many layers within the layer thickness, depends on the desired properties of the material 6, but typically it is mush denser than schematically illustrated in FIG. 5.

The FRP layer may be formed by means of a filament winding machine with a winding head adjacent to the support tube 22 and the shell 2 being formed and moving in a longitudinal direction parallel to the longitudinal axis 5 along the shell at different speeds depending on the angle A, B, C to the longitudinal axis at which the filament is being wound in the different layers while the support tube and shell being formed is rotating about its longitudinal axis 5. The angle to the longitudinal axis and the number of parallel filaments applied simultaneously govern how densely the filament is applied for each turn of the winding head back and forth along the shell and support tube. That the winding head moves along the axis 5 of the shell implies that the filament is wound at the angle to the axis between the ends 4 of the shell, as indicated by the (first) angle A in FIG. 5 for an inner layer 22 or outer layer 24 of the shell. Winding only from one end (4a) to the other end (4b) of the shell results in a unidirectional fibre pattern with all fibres at the angle A. Winding only from the end (4b) to the end (4a) of the shell results in a unidirectional fibre pattern with all fibres also at the angle A, but as measured from the opposite direction why it can instead be regarded as 180°−A (commonly denoted as −A). Winding back and forth between the ends (4) results in a woven fibre pattern and with fibres both at the angle A and fibres at the angle −A, such a fibre pattern is commonly denoted as ±A.

The resin 52 may be any suitable resin, e.g. a thermosetting or thermoplastic resin, preferably a thermosetting resin. For instance, the resin may consist of or comprise an epoxy, polyester, polyurethane or polyvinyl ester resin, or any combination thereof, preferably an epoxy resin. The resin may be the same in all the layers of the shell 2, or may be different in different of the layers.

The at least one fibre filament 51 may be of any suitable fibre material, e.g. consisting of or comprising glass fibre, carbon fibre, aramid fibre, polyethylene terephthalate fibre or natural fibre, or a combination thereof, preferably glass fibre. The fibre material of the at least one filament may be the same in all the layers of the shell 2, or may be different in different of the layers.

The layers are preferably formed by winding bundles of parallel fibre filaments on a rotating support tube 21 in a filament winding machine. The winding angle is controlled by the ratio of the lateral velocity of the winding head and the rotational speed of the support tube 21. The fibres are wetted with resin either in a separate preceding impregnation process (prepreg) or preferably by pulling bundles of fibres though an in-line resin impregnation device during winding of the tube. The resin is typically cured after completed winding of all layers in a hot air oven where the tube is rotating through-out the whole cure cycle. After curing, the support tube 21 may be removed.

Figure 6:
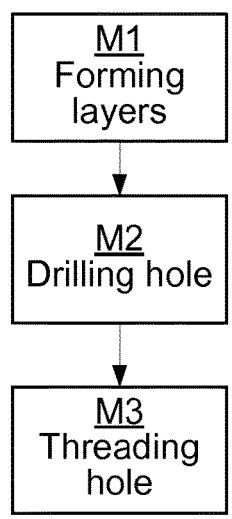
FIG. 6 is a schematic flow-chart of an embodiment of a method in accordance with the present invention.

FIG. 6 is a schematic flow-chart of an embodiment of the method of the present invention. The method is for forming the shell 2 comprising a plurality of concentric layers of the FRP material 6. The shell is for being of an FRP tube 1 having a longitudinal axis 5 and a circular cross section. At least one blind threaded longitudinal bolt hole 27 is provided from a transverse end surface 4 of the shell. The method comprises forming M1 each of the plurality of layers of the shell 2 by, around a support tube 21, applying a polymer resin 52 and winding a continuous fibre filament 51 at an angle A, B or C to the longitudinal axis 5, followed by curing of the polymer resin to form the layer having the wound filament in a solid resin matrix. The filament of the inner layer 22 of the plurality of layers is wound at a first angle A to the longitudinal axis 5 corresponding to 90° minus the lead angle β of the threading 30 of the bolt hole ±5° or ±2°. The filament of the middle layer 23, concentrically outside of the inner layer 22, is wound at a second angle C to the longitudinal axis 5 corresponding to 90° minus half of the thread angle α of the threading 30 of the bolt hole ±5° or ±2°. The filament of the outer layer 24, concentrically outside of the middle layer 23, is wound at the first angle A to the longitudinal axis 5. The method also comprises drilling M2 the at least one bolt hole 27 from a transverse end surface 4 of the shell 2 of the formed M1 plurality of layers. The method also comprises threading M3 the at least one drilled M2 bolt hole 27 with said threading 30.

In some embodiments of the present invention, the first angle A is within a range of 82-92°, preferably 87°, e.g. when the lead angle is 3°.

In some embodiments of the present invention, the second angle C is within a range of 55-65°, preferably 60°, e.g. when the thread angle is 60°.

In some embodiments of the present invention, the plurality of layers comprises at least one intermediate layer 25 or 26 positioned between the middle layer 23 and the inner layer 22 or the outer layer 24, wherein the filament 51 of each of said at least one intermediate layer has been wound at an angle B to the longitudinal axis 5 which is within a range of between the second angle C and the first angle A, e.g. between the second angle +2° and the first angle –2°.

In some embodiments of the present invention, the polymer resin 52 is a thermosetting or thermoplastic resin, e.g. comprising epoxy, polyester, polyurethane and/or polyvinyl ester, preferably epoxy.

In some embodiments of the present invention, the fibre filament 51 comprises glass fibre, carbon fibre, aramid fibre, polyethylene terephthalate fibre and/or natural fibre, preferably glass fibre.

In some embodiments of the present invention, the winding of the filament 51 is by means of a filament winding machine with a winding head adjacent to the shell 2 being formed and moving in a longitudinal direction 5 along the shell at different speeds depending on the angle A, B or C to the longitudinal axis at which the filament is being wound in the different layers.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A fibre reinforced polymer (FRP) tube having a longitudinal axis and a circular cross section, the FRP tube comprising a plurality of concentric layers of an FRP material forming a shell of the tube,
   wherein at least one blind threaded longitudinal bolt hole is provided from a transverse end surface of the shell;
   wherein the bolt hole extends in at least three of the plurality of layers, a middle layer encompassing a plane passing through a center of the bolt hole, an inner layer encompassing a plane of an innermost extent of the bolt hole, and an outer layer encompassing a plane of an outermost extent of the bolt hole;
   wherein the FRP material for each of the plurality of layers is formed from at least one wound continuous fibre filament in a solid polymer resin;
   wherein the at least one filament of each of the inner and outer layers has been wound at a first angle to the longitudinal axis corresponding to 90° minus a lead angle of the threading of the bolt hole ±5° or ±2°; and
   wherein the at least one filament of the middle layer has been wound at a second angle to the longitudinal axis corresponding to 90° minus half of a thread angle of the threading of the bolt hole ±5° or ±2°.

2. The FRP tube according to claim 1, wherein the at least one filament of the inner layer has been wound only at the positive first angle and the at least one filament of the outer layer has been wound only at the negative first angle.

3. The FRP tube according to claim 1, wherein the first angle is within a range of 82-92°.

4. The FRP tube according to claim 1, wherein the second angle is within a range of 55-65°.

5. The FRP tube according to claim 1, wherein the plurality of layers comprises at least one intermediate layer positioned between the middle layer and the inner layer or the outer layer, wherein the filament of each of said at least one intermediate layer has been wound at an angle to the longitudinal axis which is within a range of between the second angle and the first angle.

6. The FRP tube according to claim 1, wherein the polymer resin is a thermosetting or thermoplastic resin, e.g. comprising epoxy, polyester, polyurethane and/or polyvinyl ester.

7. The FRP tube according to claim 1, wherein the fibre filament comprises glass fibre, carbon fibre, aramid fibre, polyethylene terephthalate fibre and/or natural fibre.

8. A fibre reinforced polymer (FRP) tube assembly comprising:
   a first FRP tube in accordance with claim 1,
   a connecting part such as an end fitting or a second FRP tube in accordance with any preceding claim, and
   a joint joining the transverse end surface of the first FRP tube to the connecting part by means of threaded bolts screwed into the respective at least one blind threaded longitudinal bolt hole of the first FRP tube and the connecting part, whereby the first FRP tube and the connecting part are fastened to each other and longitudinally arranged next to each other.

9. The FRP tube according to claim 1, wherein the first angle is 87°, and wherein the lead angle is 3°.

10. The FRP tube according to claim 1, wherein the second angle is within a range of 58-62°.

11. The FRP tube according to claim 1, wherein the second angle is 60°.

12. The FRP tube according to claim 1, wherein the plurality of layers comprises at least one intermediate layer positioned between the middle layer and the inner layer or the outer layer, wherein the filament of each of said at least one intermediate layer has been wound at an angle to the longitudinal axis which is between the second angle +2° and the first angle –2°.

13. The FRP tube according to claim 1, wherein the polymer resin comprises epoxy, polyester, polyurethane and/or polyvinyl ester.

14. The FRP tube according to claim 1, wherein the polymer resin comprises epoxy.

15. The FRP tube according to claim 1, wherein the fibre filament comprises glass fibre.

16. A method of forming a shell comprising a plurality of concentric layers of a fibre reinforced polymer (FRP) material, of an FRP tube having a longitudinal axis and a circular cross section, wherein at least one blind threaded longitudinal bolt hole comprising a thread is provided from a transverse end surface of the shell, the method comprising:
- forming each of the plurality of layers of the shell by, around a support tube, applying a polymer resin and winding at least one continuous fibre filament at an angle to the longitudinal axis, followed by curing of the polymer resin to form the layer having the wound filament in a solid resin matrix, wherein:
  - the at least one filament of an inner layer of the plurality of layers is wound at a first angle to the longitudinal axis corresponding to 90° minus a lead angle of the thread of the bolt hole ±5° or ±2°,
  - the at least one filament of a middle layer, concentrically outside of the inner layer, is wound at a second angle to the longitudinal axis corresponding to 90° minus half of a thread angle of the thread of the bolt hole ±5° or ±2°,
  - the at least one filament of an outer layer, concentrically outside of the middle layer, is wound at 180° minus the first angle to the longitudinal axis;
- drilling the at least one bolt hole from a transverse end surface of the shell of the formed plurality of layers; and
- threading the at least one drilled bolt hole with said thread.

17. The method of claim 16, wherein the winding of the filament is performed by a filament winding machine with a winding head adjacent to the shell being formed and moving in a longitudinal direction along the shell at different speeds depending on the angle to the longitudinal axis at which the filament is being wound in the different layers.

18. The method of claim 16, wherein the at least one filament of the inner layer is wound only at the positive first angle and the at least one filament of the outer layer has been wound only at the negative first angle.

19. The method of claim 16, wherein the first angle is within a range of 82-92°.

20. The method of claim 16, wherein the second angle is within a range of 55-65°.

* * * * *